B. HORN.
MILEAGE REGISTER.
No. 77,613. Patented May 5, 1868.
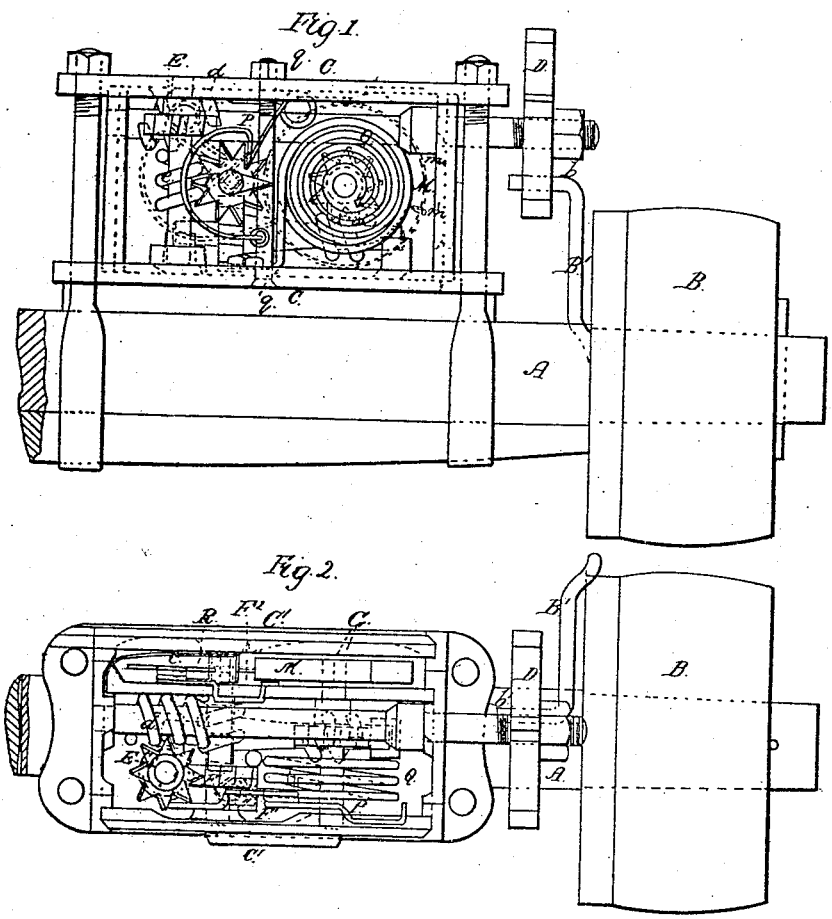

United States Patent Office.

BENJAMIN HORN, OF SERGEANTSVILLE, NEW JERSEY.

Letters Patent No. 77,613, dated May 5, 1868.

IMPROVEMENT IN MILEAGE-REGISTERS.

The Schedule referred to in these Letters Patent and making part of the same.

TO ALL WHOM IT MAY CONCERN:

Be it known that I, BENJAMIN HORN, of Sergeantsville, in the county of Hunterdon, and State of New Jersey, have invented a certain new and improved Mileage-Register for indicating the number of miles which a vehicle has travelled, intended more especially for use on carriages kept for hire at livery-stables, and the like; and I do hereby declare that the following is a full and exact description thereof.

I will first describe what I consider the best means of carrying out my invention, and will afterwards designate the points which I believe to be new.

The accompanying drawings form a part of this specification.

Figure 1 is a side elevation, and

Figure 2 a plan view of my invention.

In each figure the casing is represented as opened to show the interior.

Similar letters of reference indicate like parts in all the figures.

A is the axle, and B is the hub of the wheel mounted thereon. These parts, as also the springs and other ordinary parts of the carriage, may be of any approved construction. I mount on the hub a long piece of tempered steel, $B^1$, wound partially or entirely around the hub, at a little distance therefrom, and bent at right angles at the end, as indicated by $b^1$. This bent end forms a crank, which touches and operates the register-mechanism at each revolution of the wheel. Its peculiar construction allows it to spring, and to thereby prevent all serious fractures in case of a derangement of any part.

C is a metallic case, firmly fixed on the axle A, and adapted to enclose the mechanism of my register. $C^1$ is a sliding cover, provided with a spring-catch, $c$, which locks it.

When it is desired to open the case, and observe what distance the carriage has travelled, as indicated by the register, a knife-blade or other convenient instrument is inserted to touch the spring-catch $c$. When this spring is deflected, the slide $C^1$ may be readily withdrawn.

D is a small wheel, with arms, adapted to receive motion from the spring-crank $B^1$ $b^1$. At each revolution of the wheel B, the wheel D is turned one-fifth around. On the shaft of the wheel D is wound a wire, $d$, forming a helix, with the convolutions about as wide apart as the diameter of the wire $d$. This wire is wound on with care, by machinery or otherwise, and forms a uniform spiral like the thread of a screw. It performs the function of a screw-thread or worm in imparting motion to the worm-wheel E on a secondary shaft. I propose to tin the wire $d$, and to tin the shaft on which it is wound, and to sweat the two together, so as to insure a very firm and immovable union of the parts; but I have never found this necessary in my experiments.

On the shaft of the wheel E is similarly wound a spiral wire, $e$, which may be similarly fastened, and which similarly operates in the worm-wheel F. This train of gearing, or mechanical connections through worms, or screws and worm-wheels, may be increased or diminished as required. The last shaft of the series is squared at the end, as indicated by G. On this is fitted a wheel, M, carrying paper on its periphery, as indicated by $m$. The paper may be secured by wedging it in a recess, $m^1$, as represented. This wheel M, with its recess $m^1$, is indicated in fig. 1 in dotted lines.

On the shaft of the wheel F is a broad wing, $F^1$. At each revolution of this wing $F^1$, it acts on the spring-hammer P, drawing it gradually back until the wing $F^1$ passes, and liberates the hammer. When this occurs, it strikes with its heavy head against the finely-tempered spiral wire Q. This latter is constructed in a manner similar to the ringing-portion of clocks, and may, with some propriety, be called a bell. It is secured to the casing C by the screw-bolt $g$.

The worms and wheels are so proportioned to each other, and to the main wheel of the carriage, that the wheel F makes one complete revolution for each mile travelled by the carriage. It follows that the bell Q will be struck, and will give one clear ring for each mile travelled.

Another wing, $F^2$, is mounted on the same shaft as the wing $F^1$, and gives a corresponding motion to a pointed striker, R. This may be formed of tempered steel wire, fixed in the framing C, as represented, and its point stands near without touching the periphery of the wheel M, before described. At or about the period when the bell Q gives out its note, and informs persons in the carriage that another mile has been travelled, the sharp point R comes forward by its elastic force, on being liberated from the wing F², and produces a sharp and clear indentation in the paper which is wound on the periphery of the wheel M.

It follows from this arrangement that the carriage travels in all respects like other vehicles, and that the registering-machinery, without requiring any attention, performs the two functions of striking a bell and of pricking a mark in the paper at the end of every mile travelled. When the carriage has reached the end of its journey, or has returned to the livery-stable or other place where it belongs, the owner or other attendant, by inspection of the paper wound on the wheel M, can determine at once the number of miles travelled. By touching with a lead-pencil, or better, perhaps, a pen with ink, on the last indentation in the series, a convenient starting-place is established from which to reckon the next journey performed by the carriage.

The wheel M may be made of such size, and the worms and wheels may be so proportioned, that a great number of miles travelled may be registered in one revolution of the wheel M. I propose, for example, to make the circumference of the wheel M five inches, and to make the indentations a thirty-second of an inch apart. The mechanism will thus register one hundred and sixty miles of travel before a complete revolution of the wheel M. The same piece of paper may then afterwards be made to serve again, and register another circle, by simply moving the wheel M outward or inward on the square end of the shaft. When the paper has become too much marked to enable its indications to be observed with certainty, the paper must be removed and a new piece supplied.

I can, if preferred, make the wheel M of slate or analogous material, and provide a slate-pencil or the like in lieu of the sharp point on the end of the striker R. This modification may be made to produce conveniently-recognized pencil-markings on the wheel M, which may be readily washed off with the finger to save the trouble of changing the paper.

A padlock or other lock may be provided in lieu of or in addition to the spring-catch c to secure the slide C¹; or, instead of a slide, a door or other convenient opening of any approved construction may be made. I believe it practicable to conceal the entire works within hermetically-sealed glass, so that not even the owner of the carriage can tamper with the indications.

My mechanism allows the wheel to be turned backward to as great an extent as is ever required in any ordinary practice; but in case, through fraudulent intent, the wheel shall be held suspended and whirled backward for a long period, with a view to induce false indications of the distance, the hammer P and the marking-device R are so proportioned and arranged, relatively to their respective operating-wings F¹ F²; that the backward strain will permanently bend them, and derange the action so much as to make the fact distinctly recognizable when the apparatus is opened and inspected. An examination of the drawing will indicate how this will occur. The wings F¹ F² act, each, on the respective points or angles in the wires P and R to lift or draw back these elastic portions without encountering any obstruction other than the elastic force of the wire itself; but when the mechanism is turned in the wrong direction, the wings F¹ and F² act on the angles in the respective wires in such a direction as to force the hammer P and marking-point R forward with great violence. The hammer P presses against the bell Q, and the marking-point R presses against the wheel M with such force, and its motion in that direction is so resisted by these obstacles, that the wires are certain to be broken, or to be permanently bent. The fracture or bending of these parts involves but little expense in the refitting of the apparatus, but it is sufficient to indicate the fact unmistakably that the machine has been improperly used. I have determined by trial that a carriage may at any time be backed two or three hundred yards without inducing any such fracture. This allowance is more than sufficient for any ordinary exigency which occurs in travelling.

Having now fully described my invention, what I claim as new, and desire to secure by Letters Patent, is as follows:

1. I claim the spring-crank or pin B¹, carried on the hub B, and adapted to act on the wheel D, so as to yield when necessary, and avoid fracture, substantially as and for the purpose herein specified.

2. I claim the ringing-mechanism P Q, arranged to operate in combination with mechanism for receiving motion from the wheel of a carriage, and thus indicating to the ear each mile or other unit of distance travelled, substantially as and for the purpose herein specified.

3. I claim, in combination with mechanism, substantially as herein described, for receiving motion from the rotation of the wheel of a carriage, the striker R, operated by such mechanism at uniform distances travelled, and arranged to mark on a surface uniformly traversed across its path, substantially as and for the purpose herein specified.

4. I claim, in a mileage-register, having provision for striking a bell, or marking on a moving surface, by a blow, as described, so forming and arranging the elastic parts P R, or either of them, that, while allowing for a reasonable amount of backing without derangement, fraudulent turning of the carriage-wheel backward will break or permanently set one or both of the striking-parts, substantially as and for the purpose herein specified.

BENJAMIN HORN.

Witnesses:
    JOHN BODINE,
    DAVID BODINE.